F. SULLIVAN.
PORTABLE IRRIGATING DEVICE.
APPLICATION FILED OCT. 9, 1919.
1,350,684.
Patented Aug. 24, 1920.
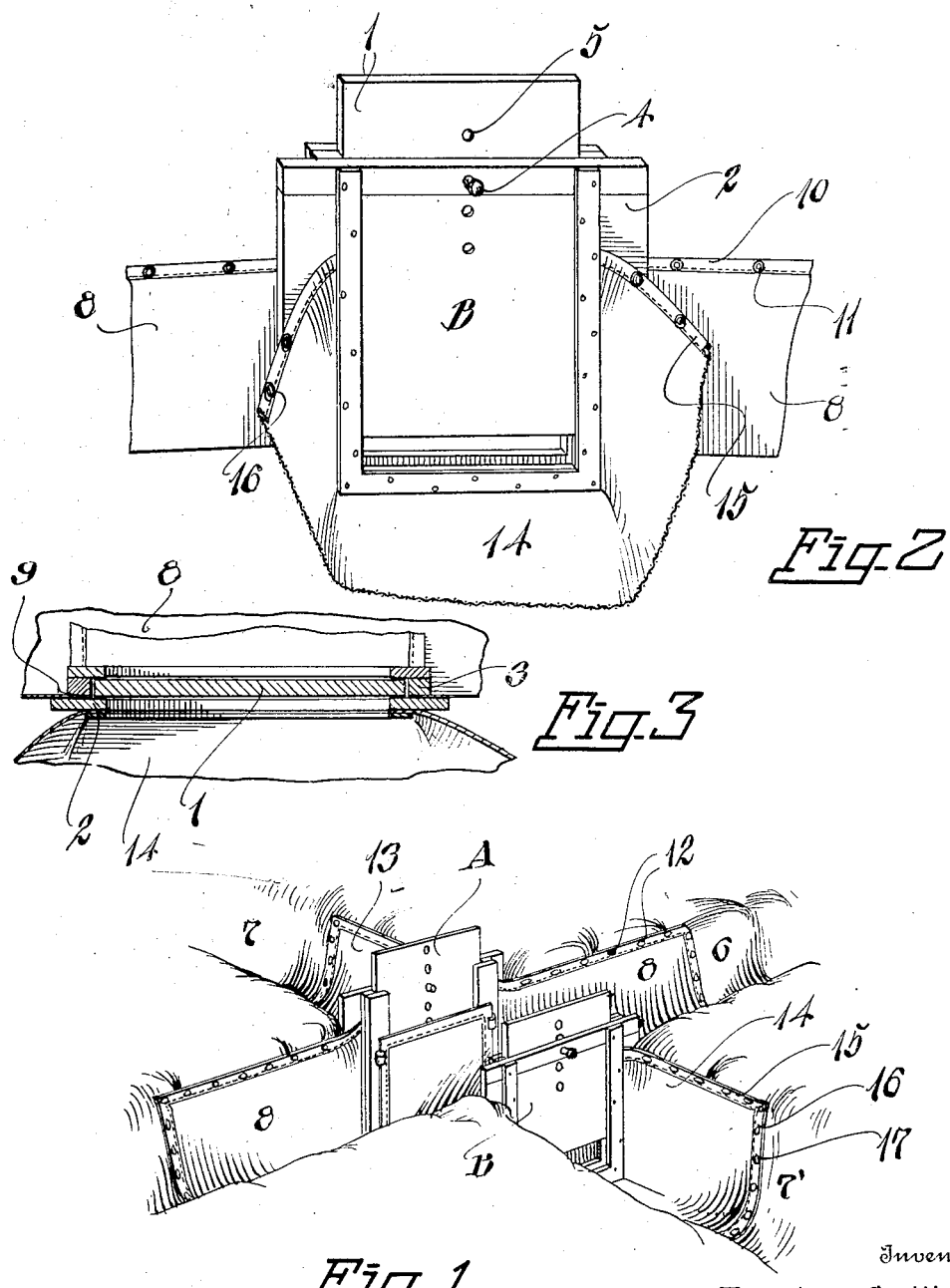

UNITED STATES PATENT OFFICE.

FRANK SULLIVAN, OF CUSICK, WASHINGTON.

PORTABLE IRRIGATING DEVICE.

1,350,684.  Specification of Letters Patent.  Patented Aug. 24, 1920.

Application filed October 9, 1919. Serial No. 329,564.

*To all whom it may concern:*

Be it known that I, FRANK SULLIVAN, a citizen of the United States, residing at Cusick, in the county of Pend Oreille and State of Washington, have invented certain new and useful Improvements in Portable Irrigating Devices, of which the following is a specification.

The present invention relates to an improved portable irrigating device involving also in its construction drain gates, together with means for protecting the bottom and sides of irrigating ditches and their laterals.

In many localities in the western part of our country a very light soil, commonly termed volcanic ash, is found, and this soil is especially fertile and productive when properly irrigated or watered. This soil occurs in arid or semi-arid districts requiring irrigating ditches, and because of the porosity and lightness of the soil great difficulty is encountered in preventing the irrigation water from washing away the soil especially at the junction of laterals with the main ditches. To overcome this difficulty I have provided a device involving one or more water gates in combination with a flexible covering for the bottom and side walls of the ditches, which covering also is capable of being converted into a dam for backing up the water and regulating its flow as desired.

In the accompanying drawings I have illustrated one complete example of the physical embodiment of my invention, constructed according to the best mode I have so far devised for the practical application of the principles of my invention.

Figure 1 is a perspective view at the junction of laterals with the irrigating ditch, showing the subject matter of my invention in use therewith.

Fig. 2 is an enlarged detail view of one of these gates and the covering aprons connected therewith.

Fig. 3 is a transverse horizontal sectional view through one of the gates showing the manner of securing the coverings or apron to the head gate or frame.

In the preferred form of the invention as illustrated in the drawings, the portable irrigating device involves a pair of complementary gates designated A and B. These gate constructions are duplicates both in construction and operation, and a description of one structure will suffice for both. The vertical gate 1 is of the usual type involving a sliding board that is movable and vertically adjustable in the rectangular frame 2 which forms the head for the gates, and this frame has vertical grooved side bars 3 in which the gate 1 may slide and be adjusted, and the gate is held in adjusted position through the instrumentality of the supporting pin 4. The pin 4 is passed through the upper cross bar of the gate head, and may be entered into a selected opening in the series indicated by the numeral 5, and arranged centrally of the gate near its upper end. It will thus be evident that the gate may be elevated as indicated in Figs. 1 and 2, and so held by the pin 4 as described.

In Fig. 1 the gates A and B are open, or elevated slightly in order that water may pass from the main gate 6 into the lateral 7, 7' leading therefrom, and the subject matter of the invention is utilized at this junction of ditches to protect the bottom and side walls thereof.

The covering or protection for the soil of the ditches is cruiform in shape, and includes a main ditch apron 8 which is preferably a single unit, oblong in shape and of a size to fit snugly against the bottom and side walls of the main ditch. This protector or covering may be made of flexible material such as canvas, or even lighter materials may be used which are not necessarily water-tight, but which must be of a texture to resists the flow of water therethrough. This apron 8 is fastened at its opposite edges to the heads of the two gates A and B, and the fabric of the apron is secured as indicated at 9 in Fig. 3 between the upright members of the side bars of the gate frame. The apron 8 is of course cut out at its sides to receive the gate frames, and these frames are fastened to the edges of the body of the apron, and form parts thereof. Around the outside edges of the apron a hem 10 is formed through which are provided, at regular intervals, openings or eyelets 11 for the reception of stakes or pegs 12. Thus the apron 8 when located in the main ditch as indicated in Fig. 1 is secured in position by the stakes or pins 12 driven into the soil of the ditch around the edges of the apron.

Similar aprons 13 and 14 are provided and are designed to extend a short way into the laterals 7 and 7'. These side aprons or protectors are also of flexible material and are provided with a hem or binding 15, eyelets 16, and also stakes or pins 17, performing the functions as mentioned in the description of the apron 8. Each of the aprons 13 and 14 is attached at the outside of a gate frame, and indicated at 18 in Fig. 3, and these aprons form troughs outside the gates A and B to protect the bottom and side walls of the laterals as the water enters the lateral through the gate openings. The main apron 8 forms a continuous trough for the main ditch extending past the lateral, and of course, the water passing through this trough is controlled and regulated by the two gates A and B.

When it is desired to divert the flow of water from the main ditch 6 to one or both of the laterals 7, 7' a few shovels of earth are thrown under the down side of the apron 8, in the bottom of the ditch, to form a dam, and by this means a sufficient head of water is provided to carry the water from the main ditch through the open gates and to the laterals 7, 7'.

It will readily be apparent that the washing away of the soil or erosion at the junction of the ditches is prevented, and at the same time a compact and efficient gate or water controlling apparatus is provided, which may be folded into small compass when not in use, for storing or transportation, and which may be applied with facility and simplicity for performing its functions.

What I claim is:

1. The combination with a flexible apron adapted to form a protecting trough, of a pair of gate frames secured to and bracing said trough, gates in the frames, and outlet troughs from said gates.

2. The combination with a flexible apron adapted to form a continuous trough, of a pair of gate frames secured to the apron, and gates in the frames, and flexible aprons secured to said frames forming lateral troughs.

In testimony whereof I affix my signature.

FRANK SULLIVAN.